US010560447B2

(12) United States Patent
Oguma et al.

(10) Patent No.: US 10,560,447 B2
(45) Date of Patent: Feb. 11, 2020

(54) AUTHENTICATION SYSTEM AND AUTHENTICATION METHOD

(71) Applicant: KYOCERA Document Solutions Inc., Osaka (JP)

(72) Inventors: Takashi Oguma, Osaka (JP); Masafumi Sato, Osaka (JP); Zhenyu Sun, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 161 days.

(21) Appl. No.: 15/867,184

(22) Filed: Jan. 10, 2018

(65) Prior Publication Data

US 2018/0198776 A1    Jul. 12, 2018

(30) Foreign Application Priority Data

Jan. 10, 2017  (JP) ................. 2017-001712

(51) Int. Cl.
*H04L 9/00*         (2006.01)
*H04L 29/06*        (2006.01)
(Continued)

(52) U.S. Cl.
CPC ........ *H04L 63/0815* (2013.01); *G06F 21/608* (2013.01); *H04L 9/321* (2013.01); *H04L 63/0807* (2013.01); *H04N 1/00856* (2013.01); *H04L 63/083* (2013.01); *H04N 2201/0094* (2013.01)

(58) Field of Classification Search
CPC ............. H04L 63/0815; H04L 63/0807; H04L 63/083; H04L 9/321; H04L 9/3226; H04L 9/3213; G06F 21/41; G06F 21/608
See application file for complete search history.

(56) References Cited

U.S. PATENT DOCUMENTS 10,305,882 B2 *   5/2019  Hinton ................ H04L 63/10
2005/0021956 A1*  1/2005  Genty ................. G06F 21/41
                                                      713/170
(Continued)

FOREIGN PATENT DOCUMENTS

JP       2005-346570 A    12/2005

*Primary Examiner* — Beemnet W Dada
(74) *Attorney, Agent, or Firm* — Hawaii Patent Services; Nathaniel K. Fedde; Kenton N. Fedde

(57) ABSTRACT

Provided is an authentication system that achieves simple single sign-on used by an MFP. A management application includes a first authentication-request unit that transmits an authentication request to a management server and delivers a token to an execution platform. The other application includes a second authentication-request unit that sends an authentication request together with the token to another server. The application-execution platform includes a token-delivery unit that delivers the token to the other application. The management server includes a first authentication unit that returns a token to the first authentication-request unit, a token-creation unit, and a second authentication unit that performs authentication for an inquiry from the other server that uses a token. The other server includes a third authentication-request unit that transfers an authentication request, and transfers an authentication OK message to the second authentication-request unit.

4 Claims, 7 Drawing Sheets

(51) Int. Cl.
*G06F 21/60* (2013.01)
*H04N 1/00* (2006.01)
*H04L 9/32* (2006.01)

(56) References Cited

U.S. PATENT DOCUMENTS

| | | | | |
|---|---|---|---|---|
| 2008/0263649 A1* | 10/2008 | Smadja | ................... | G06F 21/34 |
| | | | | 726/9 |
| 2010/0138905 A1* | 6/2010 | Kass | ....................... | G06F 21/33 |
| | | | | 726/7 |
| 2016/0179767 A1* | 6/2016 | Mavinakuli | ........... | H04L 47/803 |
| | | | | 715/760 |

* cited by examiner

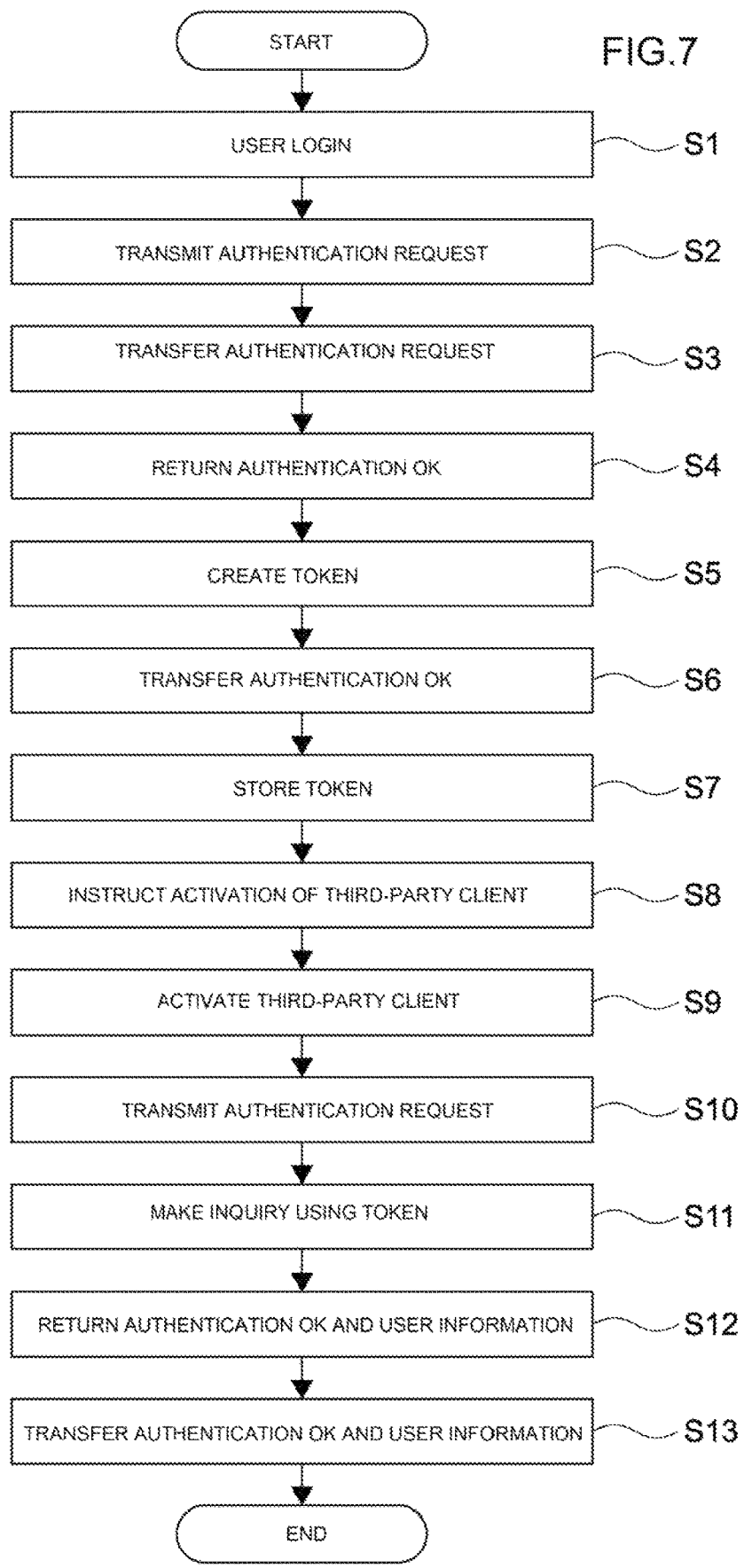

AUTHENTICATION SYSTEM AND AUTHENTICATION METHOD

INCORPORATION BY REFERENCE

This application is based on and claims the benefit of priority from Japanese Patent Application No. 2017-001712 filed on Jan. 10, 2017, the contents of which are hereby incorporated by reference.

BACKGROUND

The present disclosure relates to single sign-on of application programs that are executed by an image forming apparatus (MFP, Multifunction Peripheral).

Conventionally, in order to use plural application services it is necessary to login to each application service, and this is troublesome.

Therefore, in order to be able to use plural application services with a single login, a single sign-on method is now being used.

SUMMARY

A form of an authentication system according to the present disclosure includes a management server, an image forming apparatus and a third-party server that are connected to a network. The image forming apparatus includes: a control unit that includes at least a first Central Processing Unit (CPU); a first communication unit capable of network communication; an operation unit; a display unit; and a first storage unit. The control unit includes a management-client program, a third-party-client program and a program-execution platform. The management-client program operates in cooperation with the management server. The third-party-client program operates in cooperation with the third-party server. The program-execution platform is an execution platform for the management-client program and the third-party-client program. The first CPU, by executing the management-client program, achieves a login-receiving unit, a first authentication-request unit, and a program-activation-instruction unit. The login-receiving unit receives login from a user. The first authentication unit transmits an authentication request to the management server using a user name and password that are received by the login-receiving unit, and when a token is received together with an "authentication successful" message from the management server, delivers the token to the program-execution platform. The program-activation-instruction unit, based on a user instruction via the operation unit, instructs the program-execution platform to activate the third-party-client program. The first CPU, by executing the third-party-client program, achieves a second authentication-request unit. The second authentication-request unit transmits an authentication request together with the token that is delivered by the program-execution platform to the third-party server. The first CPU, by executing the program-execution platform, achieves a token-delivery unit and a program-activation unit. The token-delivery unit receives the token from the first authentication-request unit and stores the token in the first storage unit, and when the third-party-client program is activated, delivers the token that is stored in the first storage unit to the activated third-party-client program. The program-activation unit, based on an instruction from the program-activation-instruction unit, activates the instructed third-party-client program. The management server includes a second CPU, a second communication unit capable of network communication, and a second storage unit. The second CPU, by executing the management server program, achieves a first authentication unit, a token-creation unit, and a second authentication unit. The first authentication unit performs user authentication based on an authentication request that uses a user name and a password and that is received from the first authentication-request unit of the image forming apparatus, and when user authentication is successful, returns an "authentication successful" message together with the token to the first authentication-request unit. The token-creation unit, when user authentication is successful, creates the token and stores the token in the second storage unit. The second authentication unit performs user authentication for an inquiry using the token from the third-party server. The third-party server includes a third CPU, and a third communication unit capable of network communication. The third CPU, by executing a third-party server program, achieves a third authentication unit. The third authentication unit receives an authentication request that uses the token from the second authentication-request unit of the image forming apparatus, and performs an inquiry using the token to the second authentication unit of the management server, and when an "authentication successful" message is transmitted from the second authentication unit, transfers the "authentication successful" message to the second authentication-request unit.

A form of an authentication method according to the present disclosure is an authentication method in an authentication system that includes a management server, an image forming apparatus and a third-party server that are connected to a network. A login-receiving unit of the image forming apparatus receives login from a user. A first authentication-request unit of the image forming apparatus transmits an authentication request to the management server using a user name and a password that are received by the login-receiving unit. The first authentication unit of the management server performs user authentication based on an authentication request that uses the user name and password and that is received from the first authentication-request unit of the image forming apparatus. When user authentication is successful, a token-creation unit of the management server creates a token and stores the token in a second storage unit, and the first authentication unit of the management server returns an "authentication successful" message together with the token to the first authentication-request unit. The first authentication-request unit that receives the "authentication successful" message together with the token delivers the token to a token-delivery unit. The token-delivery unit to which the token is delivered stores the received token in a first storage unit. A program-activation-instruction unit of the image forming apparatus, based on a user instruction via an operation unit, instructs a program-activation unit to activate a third-party-client program. The program-activation unit activates the third-party-client program, and the token-delivery unit delivers the token that is stored in the first storage unit to the activated third-party-client program. A second authentication-request unit of the third-party-client program transmits an authentication request together with the token that is delivered by the token-delivery unit to the third-party server. A third authentication unit of the third-party server receives the authentication request that uses the token from the second authentication-request unit of the image forming apparatus, and performs an inquiry using the token to a second authentication unit of the management server. The second authentication unit of the management server performs user authentication for the inquiry that uses the token from the third-party server. A third authentication unit of the third-party server, when an "authentication successful" message is transmitted from the second authentication unit, transfers the "authentication successful" message to the second authentication-request unit.

BRIEF DESCRIPTION OF THE DRAWINGS

FIG. 7 is a flowchart of processing in an authentication system 1.

DETAILED DESCRIPTION

In the following, an embodiment according to the present disclosure will be explained with reference to the drawings.

Figure 1:
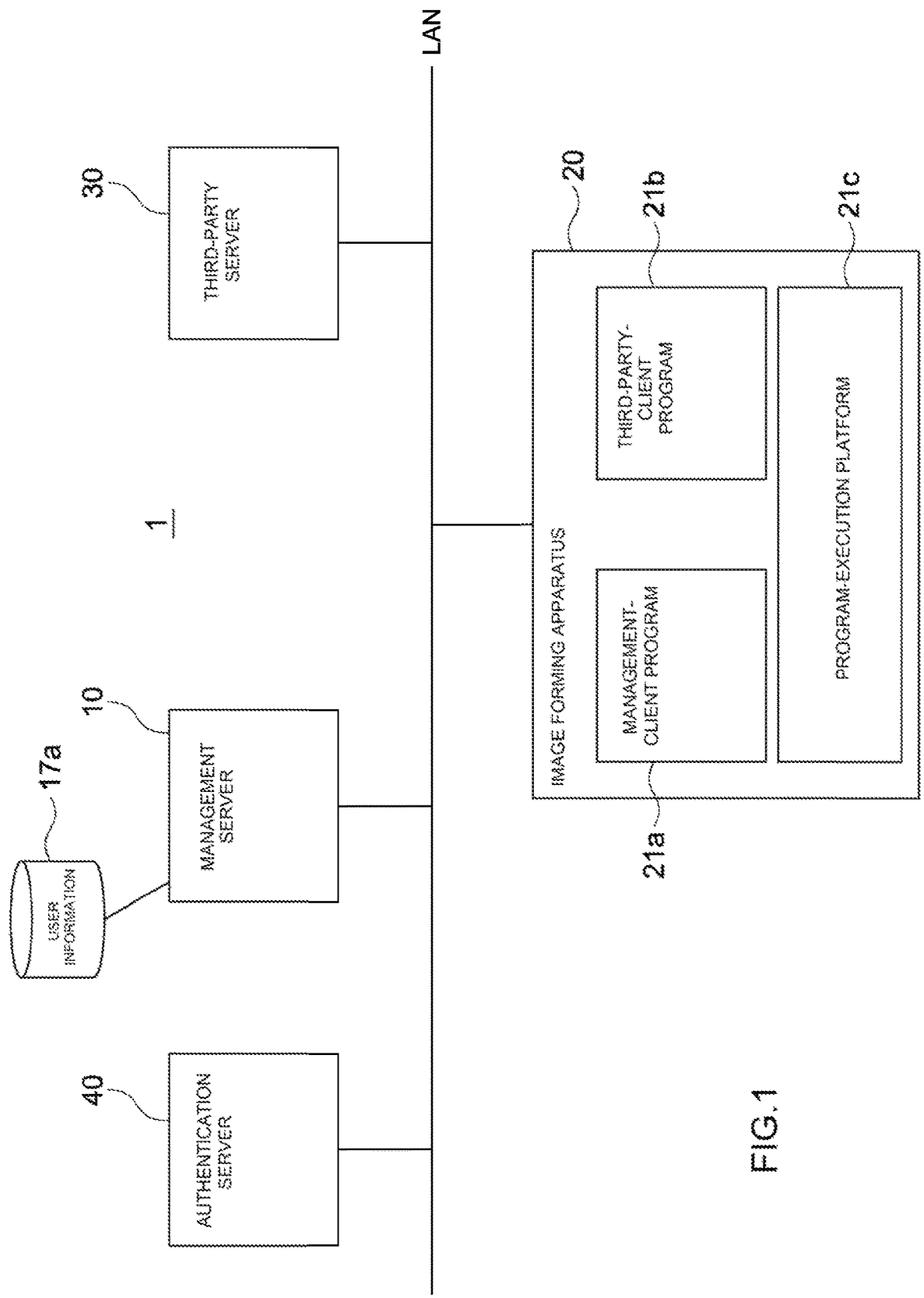
FIG. 1 is a configuration diagram of an embodiment of an authentication system 1 according to the present disclosure.

First, the overall configuration of an embodiment of an authentication system according to the present disclosure will be explained. FIG. 1 is a configuration diagram of an embodiment of an authentication system 1 according to the present disclosure.

The authentication system 1 is configured by including a management server 10, an image forming apparatus 20, a third-party server 30 and authentication server 40 that are connected by an LAN (Local Area Network).

Plural application programs that can be installed and used later are installed in the image forming apparatus 20.

In order to use these application programs, a user must first login from the operation panel of the image forming apparatus 20 to a management-client program 21a that is one application program.

The management-client program 21a uses a management server 10 and an authentication server 40 for performing user authentication when the user logs in.

When the user account is a local-user account, authentication is performed by the management server 10. When the user account is a global-user account, an authentication request from the image forming apparatus 20 is transferred from the management server 10 to the authentication server 40, and authentication is performed by the authentication server 40.

A third-party-client program 21b that is one application program that is provided by a third party performs concrete processing in cooperation with the third-party server 30 that is installed on the LAN.

When not using the single sign-on function, the user logs in to the management-client program 21a using a user name, password and the like, and then activates the third-party-client program 21b from the operation screen that is displayed. The user then must log in again by inputting the user name, password and the like to the third-party-client program 21b.

In this embodiment of an authentication system 1 according to the present disclosure, when activating a different third-party-client program 21b after having once logged into the management-client program 21a, the procedure for logging into the third-party-client program 21b can be omitted.

The program-execution platform 21c is an execution platform for operating the management-client program 21a and the third-party-client program 21b on the image forming apparatus 20.

User information 17a that is held by the management server 10 defines the printing policy or the like when the user performs a printing process using the image forming apparatus 20. The printing policy, for example, is a policy of not allowing a user to use color printing or to force the user to use double-sided printing.

Figure 2:
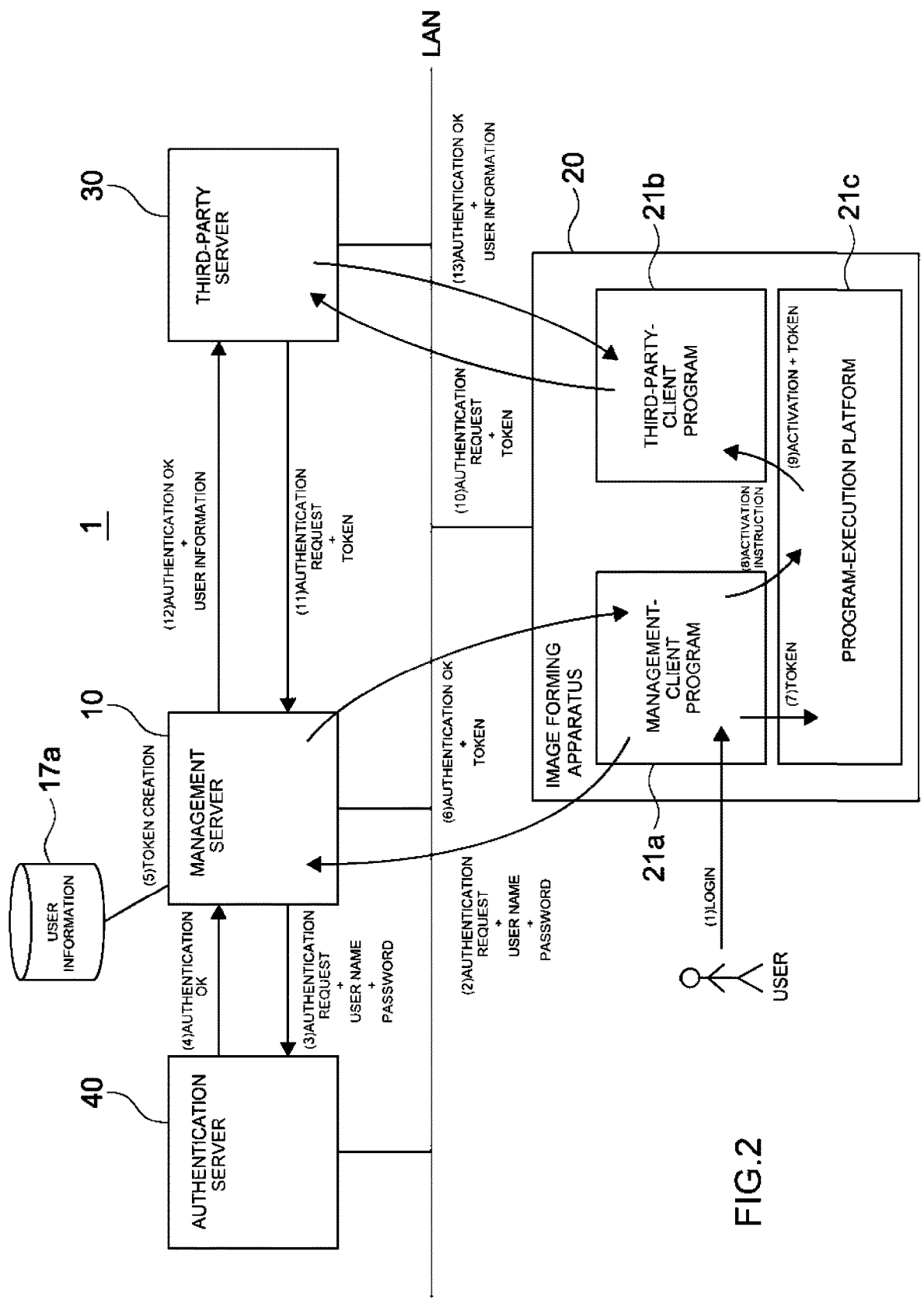
FIG. 2 is a diagram that illustrates the overall flow of processing in an embodiment of an authentication system 1 according to the present disclosure.

Next, a summary of the overall flow of processing in this embodiment of an authentication system 1 according to the present disclosure will be explained. FIG. 2 is a diagram that illustrates the overall flow of processing in this embodiment of an authentication system 1 according to the present disclosure.

(1) First, from the operation panel of the image forming apparatus 20, the user starts the login process to the management-client program 21a.

(2) Next, the management-client program 21a transmits an authentication request to the management server 10 using a user name and password that are inputted by the user. The user name that is inputted here is the global-user account that is authenticated by the authentication server 40.

(3) Next, the management server 10 transfers the authentication request, user name and password that are received from the user to the authentication server 40.

(4) Next, the authentication server 40 perform an authentication process of the user, and when there is no problem, returns a message indicating that authentication is OK (authentication is successful) to the management server 10.

(5) The management server 10 that receives the reply from the authentication server 40 indicating that authentication is OK creates a token for single sign-on.

(6) Next, the management server 10 transmits the authentication OK message and the created token to the management-client program 21a. The management-client program 21a receives the authentication OK message and the token, and the login process of the user to the management-client program 21a is completed.

(7) Next, the management-client program 21a delivers the received token to the program-execution platform 21c, and the program-executing platform 21c holds that token.

(8) Next, according to an instruction from the user, the management-client program 21a instructs the program-execution platform 21c to activate the third-party-client program 21b.

(9) Next, based on the instruction from the management-client program 21a, the program-executing platform 21c activates the third-party-client program 21b. When doing this, the program-execution platform 21c delivers the held token to the third-party-client program 21b.

(10) Next, the third-party-client program 21b transmits an authentication request together with the token to the third-party server 30.

(11) Next, the third-party server 30 uses the received token to perform an inquiry to the management server 10.

(12) Next, the management server 10 receives the token used in the inquiry and performs authentication, and when there is no problem with authentication, returns an authentication OK message and user information that is correlated with the token to the third-party server 30.

(13) Next, the third-party server 30 returns the received authentication OK message and user information to the third-party-client program 21b. The third-party-client program 21b receives the authentication OK message and user information, and completes the login process to the third-party-client program 21b. The third-party-client program 21b can perform various processing by using the received user information.

Next, the configuration of the management server 10 will be explained. The management server 10 may be configured by using dedicated hardware and software, or may be configured by using a typical computer. A configuration diagram of the management server 10 is illustrated in FIG. 3.

Figure 3:
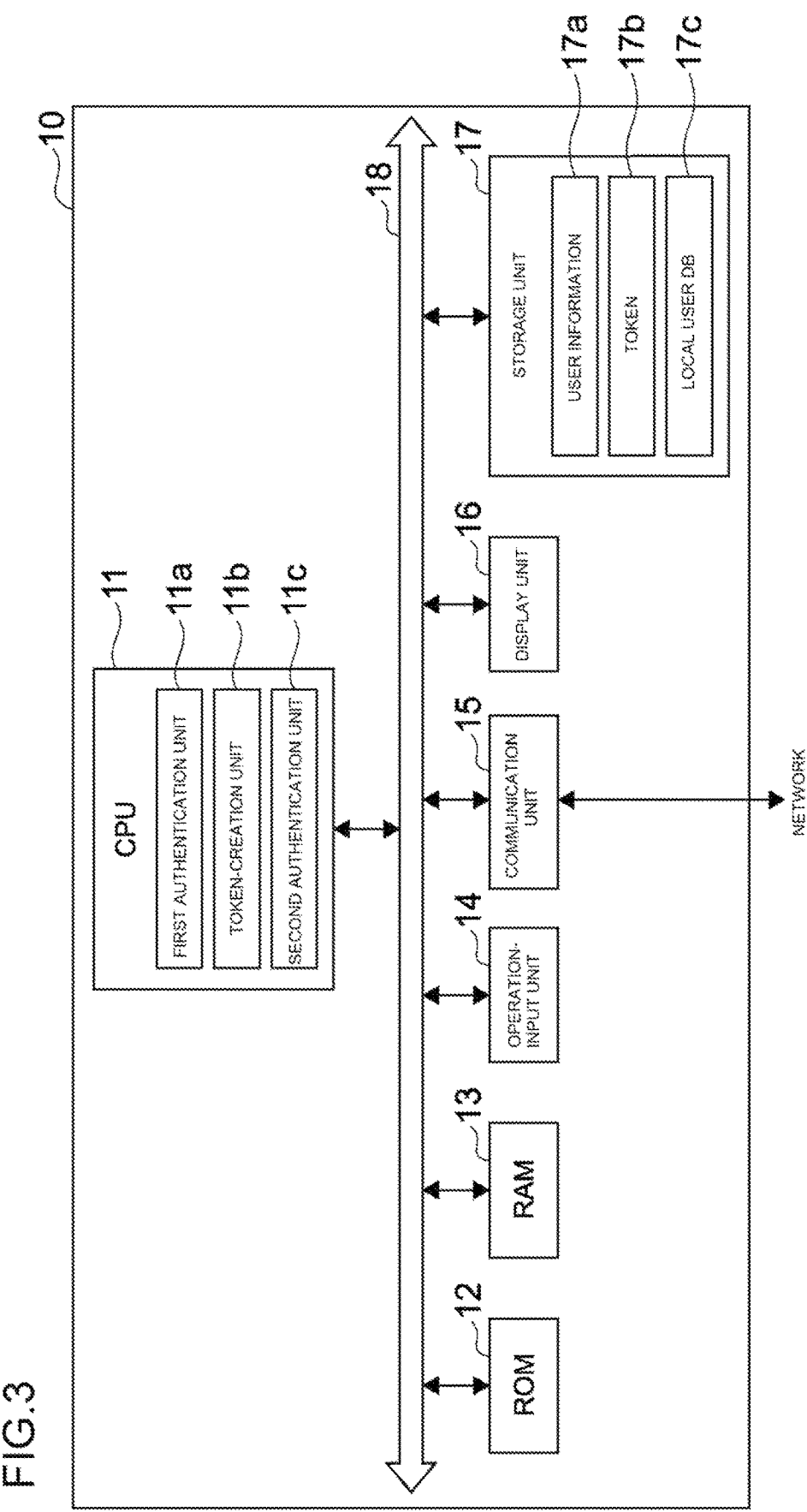
FIG. 3 is a configuration diagram of a management server 10.

As illustrated in FIG. 3, the management server 10 has a CPU (Central Processing Unit) 11, a ROM (Read Only Memory) 12, a RAM (Random Access Memory) 13, an operation-input unit 14, a communication unit 15 (second communication unit), a display unit 16, and a storage unit 17 (second storage unit). These blocks are each connected via a bus 18.

The ROM 12 stores plural programs and data such as firmware and the like for executing various processing. The RAM 13 is used as a work area for the CPU 11, and temporarily holds the OS (Operating System), various applications that are being executed, and various data that are being processed.

The storage unit 17 is, for example, a HDD (Hard Disk Drive), a flash memory, or other non-volatile memory. The storage unit 17 stores the OS and various applications, various data, user information 17a, a token 17b, and a local user DB (Database) 17c.

User information 17a is information that defines the printing policy and the like for each user.

A token 17b is used for achieving the single sign-on function, and is created when authentication of a user that is logging in from the management-client program 21a is successful.

The local-user DB 17c is a database that is locally created by the management server 10 for registering local users, and is used for user authentication when a user that is logging in from the management-client program 21a is a local user.

The communication unit 15 is connected with a network for performing the exchange of information with the third-party server 30 and the authentication server 40.

The CPU 11 expands a program of the plural programs that are stored in the ROM 12 or storage unit 17 that corresponds to a command that is given from the operation-input unit 14 in the RAM 13, and appropriately controls the display unit 16 and the storage unit 17 according to this expanded program.

The operation-input unit 14 is, for example, a pointing device such as a mouse or the like, a keyboard, a touch panel, or other operation apparatus.

The display unit 16 is, for example, a liquid-crystal display, an EL (Electro-Luminescence) display, a plasma display, or the like.

Next, the functional blocks that are achieved by the CPU 11 executing a management server program will be explained.

The functional blocks that are achieved by the CPU 11 of the management server 10 are a first authentication unit 11a, a token-creation unit 11b, and a second authentication unit 11c.

The first authentication unit 11a, in cooperation with the management-client program 21a of the image forming apparatus 20, performs authentication of a local user that is logging into the image forming apparatus 20. When a user logs in using a local-user account, the first authentication unit 11a transfers the authentication request that is received from the management-client program 21a together with the user name and password to the authentication server 40.

The token-creation unit 11b, when authentication of a user that is logging into the management-client program 21a of the image forming apparatus 20 is successful, creates a token 17b for achieving the single sign-on function. The token 17b that is created, together with being stored in the storage unit 17, is transmitted to the management-client program 21a.

The second authentication unit 11c performs authentication of a user in response to an inquiry using a token from the third-party server 30. Authentication may be performed by comparing a token that is delivered from the third-party server 30 with a token 17b that is stored in the storage unit 17, and determining whether or not the tokens match. By using this configuration it is possible to perform authentication with a small amount of computation.

When authentication of a user using a token is successful, the second authentication unit 11c, of the user information 17a that is stored in the storage unit 17, transmits the user information 17a that corresponds to the token to the third-party server 30 together with an authentication OK message.

Figure 4:
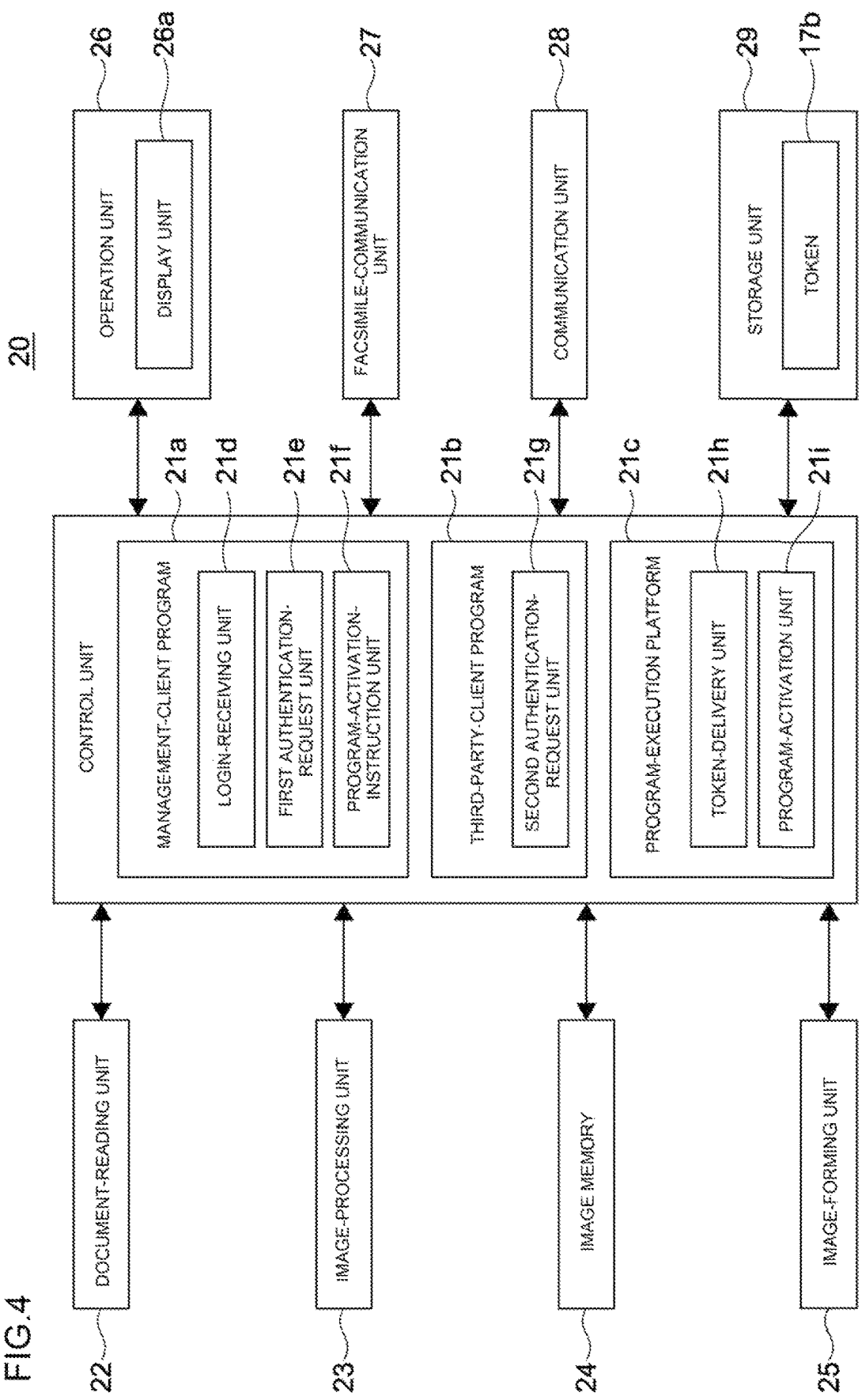
FIG. 4 is a configuration diagram of an image forming apparatus 20.

Next, the configuration of the image forming apparatus 20 will be explained. FIG. 4 is a configuration diagram of the image forming apparatus 20.

The image forming apparatus 20 includes a control unit 21. The control unit 21 includes a CPU, a RAM, a ROM, a dedicated hardware circuit and the like, and performs control of the overall operation of the image forming apparatus 20.

The control unit 21 is connected with an image-reading unit 22, an image-processing unit 23, an image memory 24, an image-forming unit 25, an operation unit 26, a display unit 26a, a facsimile-communication unit 27, a communication unit 28 (first communication unit), a storage unit 29 (first storage unit) and the like. The control unit 21 performs control of the operation of each of the connected units, and performs transmitting and receiving of signals and data between each of the units.

The control unit 21 drives mechanisms and control processing that is necessary for executing operation control for each of the functions such as a scanning function, printing function, copying function, facsimile transmitting/receiving function and the like. The control unit 21 performs control according to job execution instructions from the user that are inputted using the operation unit 26 or a PC or the like that is connected to a network.

Moreover, the control unit 21 has a management-client program 21a, a third-party-client program 21b, and a program-execution platform 21c. The management-client program 21a, third-party-client program 21b, program-execution platform 21c are functional blocks that are achieved by the CPU executing programs that are loaded into RAM from ROM.

The management-client program 21a is a application program that, in cooperation with the management server 10 and authentication server 40, performs authentication of a user that logs in using the operation unit 26. Then, by the CPU executing the management-client program 21a, a login-receiving unit 21d, a first authentication-request unit 21e, and a program-activation-instruction unit 21f are achieved.

The login-receiving unit 21d, via the operation unit 26, receives user login.

The first authentication-request unit 21e transmits an authentication request to the first authentication unit 11a of the management server 10 using a user name and password that are received by the login-receiving unit 21d. Moreover, the first authentication-request unit 21e delivers the token that is received together with the authentication OK message from the management server 10 to the program-execution platform 21c.

The program-activation-instruction unit 21f, based on an instruction from the user via the operation unit 26, instructs the program-execution platform 21c to activate the installed third-party-client program 21b.

The third-party-client program 21b is an application program that is provided by a third party, and operates in cooperation with the third-party server 30. By the CPU executing the third-party-client program 21b, the second authentication-request unit 21g is achieved.

The second authentication-request unit 21g transmits an authentication request together with the token that is delivered from the program-execution platform 21c to the third-party server 30.

By the CPU executing the program-execution platform 21c, a token-delivery unit 21h and a program-activation unit 21i are achieved.

The token-delivery unit 21h receives a token 17b from the first authentication-request unit 21e, and stores the token 17b in the storage unit 29. Moreover, the when the third-party-client program 21b is activated by the program-activation unit 21i, the token-delivery unit 21h delivers the token 17b that is stored in the storage unit 29 to the activated third-party-client program 21b.

The program-activation unit 21i activates the third-party-client program 21b based on an instruction from the program-activation unit 21f.

The document-reading unit 22 reads images from a document.

The image-processing unit 23 performs image processing as necessary of image data of images that are read by the document-reading unit 22. For example, the image-processing unit 23, in order to improve the quality after an image that is read by the document-reading unit 22 is formed, performs image processing such as shading correction and the like.

The image memory 24 is an area that temporarily stores data of document images that is obtained by reading by the document-reading unit 22, and temporarily stores data that will be the target of printing by the image-forming unit 25.

The image-forming unit 25 performing image forming of image data and the like that is read by the document-reading unit 22.

The operation unit 26 includes a touch-panel unit and operation-key unit that receive instructions from a user for the various operations and processing that can be executed by the image forming apparatus 20. The touch-panel unit includes a display unit 26a such as an LCD (Liquid Crystal Display) or the like that is provided with a touch panel.

The facsimile-communication unit 27 includes an encoding/decoding unit, a modulation/demodulation unit, and a NCU (Network Control Unit), and performs transmission of facsimiles by using a public telephone network.

The communication unit 28 includes a communication module such as a LAN board and the like, and via a LAN or the like that is connected to the communication unit 28, performs transmitting and receiving of various data to and from an apparatus (PC or the like) of the management server 10, third-party server 30 and the like.

The storage 29 stores document images or the like that are read by the document-reading unit 22 and tokens 17b. The storage unit 29 is a large capacity storage apparatus such as a HDD or the like.

Next, the configuration of the third-party server 30 will be explained. The third-party server 30 may be configured by using dedicated hardware and software or may be configured using a typical computer. A configuration diagram of the third-party server 30 is illustrated in FIG. 5.

Figure 5:
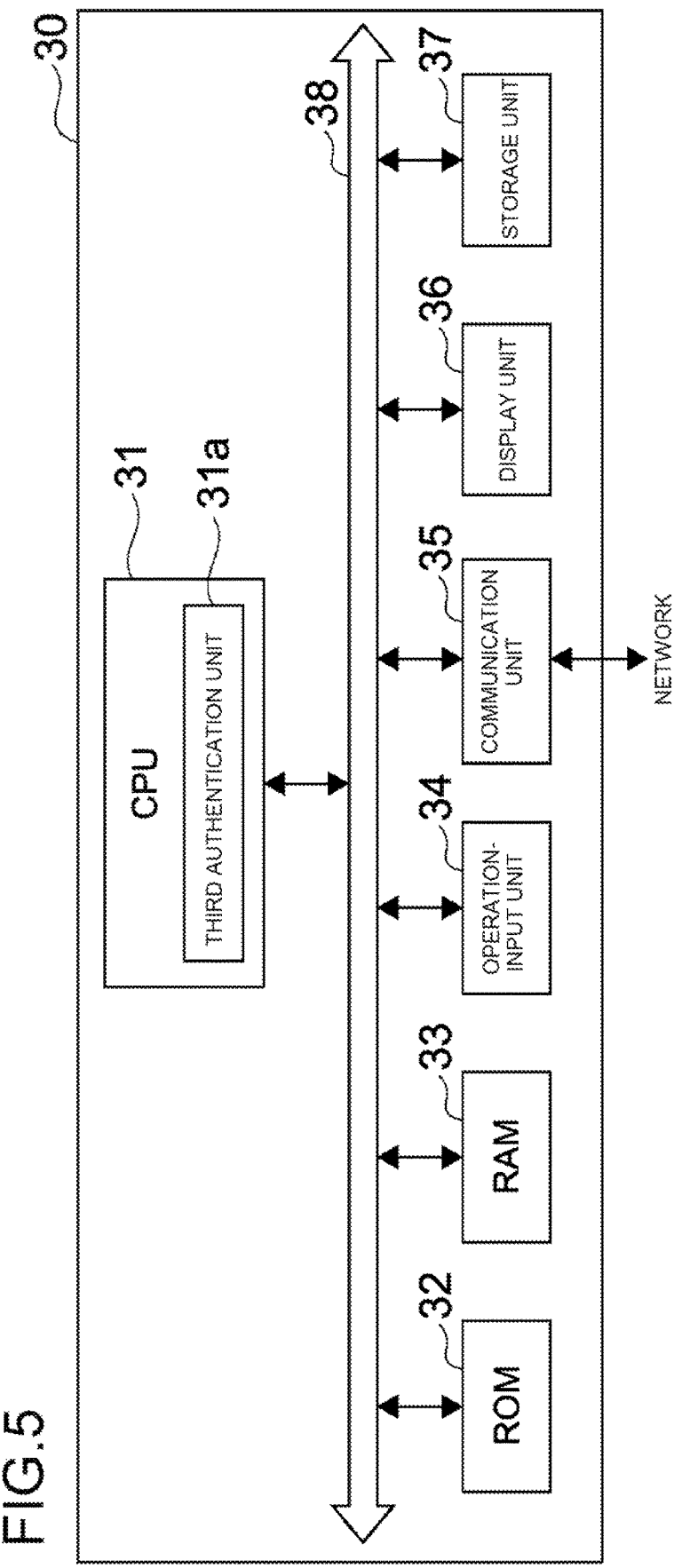
FIG. 5 is a configuration diagram of a third-party server 30.

As illustrated in FIG. 5, the third-party server 30 has a CPU 31, a ROM 32, a RAM 33, an operation-input unit 34, a communication unit 35 (third communication unit), a display unit 36, and a storage unit 37, and these blocks are connected via a bus 38.

ROM 32 stores plural programs and data such as firmware and the like for executing various processing. The RAM 33 is used as a work area of the CPU 31, and temporarily holds the OS, various applications that are being executed, and various data that are being processed.

The storage unit 37 is, for example, a HDD, a flash memory or other non-volatile memory. The storage unit 37 stores the OS, various applications and various data.

The communication unit 35 is connected to a network for performing an exchange of information with the image forming apparatus 20 and management server 10.

The CPU 31, of the plural programs that are stored in ROM 32 and the storage unit 37, expands a program that corresponds to a command given from the operation-input unit 34 in the RAM 33, and performs appropriate control of the display unit 36 and storage unit 37 according to the expanded program.

The operation-input unit 34 is, for example, a pointing device such as a mouse or the like, a keyboard, a touch panel, or other operation apparatus.

The display unit 36 is, for example, a liquid-crystal display, an EL display, a plasma display or the like.

Next, the functional block that is achieved by the CPU 31 executing a program for the third-party server will be explained.

The functional block that is achieved by the CPU 31 of the third-party server 30 is the third authentication unit 31a.

The third authentication unit 31a, in cooperation with the third-party-client program 21b of the image forming apparatus 20, achieves single sign-on of a user that logs in to the third-party program 21b of the image forming apparatus 20.

More specifically, the third authentication unit 31a receives an authentication request that uses a token from a second authentication-request unit 21g of the image forming apparatus 20, and performs an inquiry using a token to the second authentication unit 11c of the management server 10. Moreover, when an authentication OK message and user information 17a are transmitted from the second authentication unit 11c, the third authentication unit 31a transfers that authentication OK message and user information 17a to the image forming apparatus 20.

Next, the configuration of the authentication server 40 will be explained. The authentication server 40 may be configured using dedicated hardware and software, or may be configured using a typical computer. A configuration diagram of the authentication server 40 is illustrated in FIG. 6.

Figure 6:
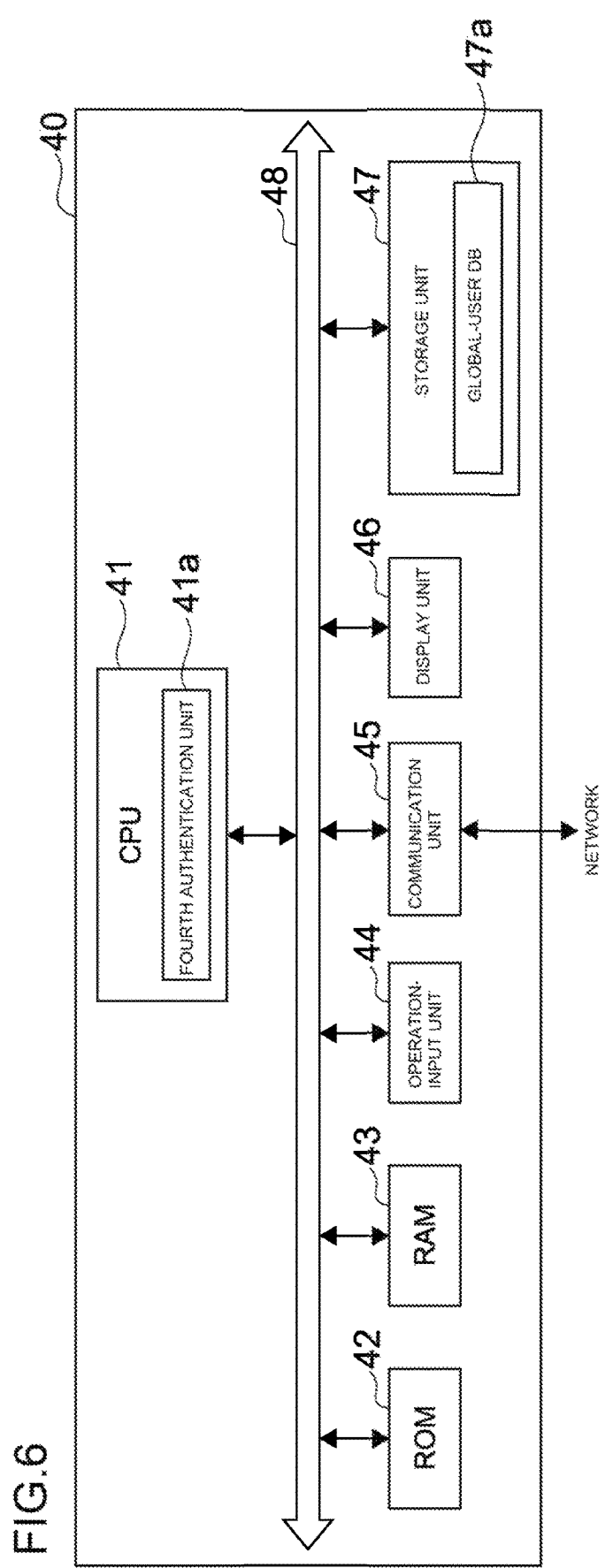
FIG. 6 is a configuration diagram of an authentication server 40.

As illustrated in FIG. 6, the authentication server 40 has a CPU 41, a ROM 42, a RAM 43, an operation-input unit 44, a communication unit 45 (fourth communication unit), a display unit 46 and a storage unit 47, and each of theses blocks is connected via a bus 48.

The ROM 42 stores plural programs and data such as firmware and the like for executing various processing. The RAM 43 is used as a work area of the CPU 41, and temporarily stores the OS, various applications that are being executed, and various data that are being processed.

The storage unit 47 is, for example, a HDD, a flash memory, or other non-volatile memory. The storage unit 47 stores the OS, various applications, various data, and a global-user DB 47a for authenticating a global user.

The global-user DB 47a is a database that global users globally-created by the authentication server 40 are registered, and is used for user authentication when a user that is logging in from the management-client program 21a is a global user.

The communication unit 45 is connected to a network for performing exchange of information with the management server 10.

The CPU 41, of the plural programs that are stored in the ROM 42 or storage unit 47, expands a program that corresponds to a command that is given from the operation-input unit 44 in the RAM 43, and performs appropriate control of the display unit 46 and the storage unit 47 according to that expanded program.

The operation-input unit 44 is, for example, a pointing device such as a mouse or the like, a keyboard, a touch panel, or other operation apparatus.

The display unit 46 is, for example, a liquid-crystal display, an EL display, a plasma display or the like.

Next, the functional block that is achieved by the CPU 41 executing a program for the authentication server will be explained.

The functional block that is achieved by the CPU 41 of the authentication server 40 is a fourth authentication unit 41a.

The fourth authentication unit 41a, in cooperation with the first authentication unit 11a of the management server 10, performs authentication of a global user that is registered in the global-user DB 47a.

Next, the flow of detailed processing by the authentication system 1 will be explained. FIG. 7 is a flowchart for explaining the flow of detailed processing by the authentication system 1. The following explanation presumes a case in which the user that is logging in is logging in using a global-user account. When a local-user account is used, user authentication is performed by the first authentication unit 11a.

First, the login-receiving unit 21d received login by a user via the operation unit 26 (step S1).

Next, the first authentication-request unit 21e transmits an authentication request together with a user name and password that are inputted by the user to the first authentication unit 11a of the management server 10 (step S2).

Next, the first authentication unit 11a transfers the received authentication request, the user name and the password to the fourth authentication unit 41a of the authentication server 40 (step S3).

Next, the fourth authentication unit 41a performs user authentication using the global-user DB 47a. Here, it is presumed that user authentication is successful. The fourth authentication unit 41a returns an authentication OK message to the first authentication unit 11a (step S4).

Next, the token-creation unit 11b of the management server 10 that receives the authentication OK message creates a token 17b (step S5). Further, the created token 17b, together with being delivered to the first authentication unit 11a, is stored in the storage unit 17.

Next, the first authentication unit 11a attaches the token 17b that is created by the token-creation unit 11b to the authentication OK message, and transfers that authentication OK message to the first authentication-request unit 21e (step S6).

Next, the first authentication-request unit 21e that receives the authentication OK message and token 17b delivers the token 17b to the program-execution platform 21c, and the token-delivery unit 21h of the program-execution platform 21c stores the token 17b in the storage unit 29 (step S7).

Next, the program-activation-instruction unit 21f, based on a user instruction, sends an instruction to the program-activation unit 21i of the program-executing platform 21c to activate the third-party-client program 21b (step S8).

Next, the program-activation unit 21i activates the third-party-client program 21b that has been instructed by the user, and the token-delivery unit 21h acquires the token 17b from the storage unit 29 and delivers that token 17b to the activated third-party-client program 21b (step S9).

Next, the second authentication-request unit 21g of the activated third-party-client program 21b transmits an authentication request together with the token 17b to the third authentication unit 31a of the third-party server 30 (step S10).

Next, the third authentication unit 31a performs an inquiry to the second authentication unit 11c of the management server 10 using the received token 17b (step S11).

Next, the second authentication unit 11c performs user authentication by comparing the received token 17b with the token 17b that is stored in the storage unit 17. Here, it is presumed that user authentication is successful. When user authentication is successful, the second authentication unit 11c acquires user information 17a that corresponds to the token 17b that was used in authentication from the storage unit 17, and returns that user information 17a together with an authentication OK message to the third authentication unit 31a of the third-party server 30 (step S12)

Next, the third authentication unit 31a of the third party sensor 30 transfers the received authentication OK message and the user information 17a to the third-party-client program 21b of the image forming apparatus 20 (step S13). By the third-party-client program 21b receiving the authentication OK message, the single sign-on process by the authentication system 1 ends.

As described above, the authentication system 1 according to the present disclosure includes a management server 10, an image forming apparatus 20 and a third-party server 30 that are connected to a network;

the image forming apparatus 20 includes a first communication unit 28 that is capable of communication over the network, an operation unit 26, a display unit 26a, a first storage unit 29, a management-client program 21a that operates in cooperation with the management server 10, a third-party-client program 21b that operates in cooperation with the third-party server 30, and a program-execution platforms 21c that is an execution platform for the management-client program 21a and the third-party-client program 21b;

the management-client program 21a includes: a login-receiving unit 21d that receives login from a user; a first authentication-request unit 21e that transmits an authentication request to the management server 10 using a user name and password that are received by the login-receiving unit 21d, and when an "authentication successful" message is received together with a token 17b from the management server 10, delivers the token 17b to the program-executing platform 21c; and a program-activation-instruction unit 21f that, based on a user instruction via the operation unit 26, instructs the program-execution platform 21c to activate the third-party-client program 21b;

the third-party-client program 21b includes a second authentication-request unit 21g that transmits an authentication request, together with the token 17b that is delivered by the program-execution platform 21c, to the third-party server 30;

the program-execution platform 21c includes: a token-delivery unit 21h that receives the token 17b from the first authentication-request unit 21e and stores that token 17b in the first storage unit 29, then when the third-party-client program 21b is activated, delivers the token 17b that is stored in the first storage unit 29 to the activated third-party-client program 21b; and a program-activation unit 21i that, based on an instruction from the program-activation-instruction unit 21f, activates the instructed third-party-client program 21b;

the management server 10 includes: a second communication unit 15 that is capable of communication on a network; a second storage unit 17; a first authentication unit 11a performs user authentication based on an authentication request that uses a user name and a password and that is received from the first authentication-request unit 21e of the image forming apparatus 20, and returns an "authentication successful" message together with the token 17b to the first authentication-request unit 21e when the user authentication is successful; a token-creation unit 11b that creates the token 17b when the user authentication is successful, and stores that token 17b in the second storage unit 17; and a second authentication unit 11c that performs user authentication for an inquiry from the third-party server 30 that uses the token 17b; and the third-party server 30 includes: a third communication unit 35 that is capable of communication on a network; and a third authentication unit 31a that receives an authentication request that uses the token 17b from the second authentication-request unit 21g of the image forming apparatus 20, performs an inquiry using the token 17b to the second authentication unit 11c of the management server 10, and when an "authentication successful" message is transmitted from the second authentication unit 11c, transfers the authentication OK message to the second authentication-request unit 21g.

Therefore, it is possible to achieve a single sign-on function having a simple mechanism that is used by an application program operating on an image forming apparatus.

A single sign-on mechanism that targets a typical Web application server is a complicated mechanism, and in order to be used by an application program that operates on an image forming apparatus, there is room for improvement.

Taking the above into consideration, the object of the present disclosure is to provided an authentication system and authentication method capable of achieving a single sign-on function having a simple mechanism that is used by an application program operating on an image forming apparatus.

The present disclosure is not limited to only the embodiment described above, and it is obvious that various modifications can be added within a range that does not depart from the gist of the present disclosure.

What is claimed is:

1. An authentication system comprises a management server, an image forming apparatus and a third-party server that are connected to a network; wherein the image forming apparatus comprises:
a control unit that includes at least a first Central Processing Unit (CPU);
a first communication unit capable of network communication;
an operation unit;
a display unit; and
a first storage unit;
the control unit includes:
a management-client program that operates in cooperation with the management server;
a third-party-client program that operates in cooperation with the third-party server; and
a program-execution platform that is an execution platform for the management-client program and the third-party-client program;
the first CPU, by executing the management-client program, achieves:
a login-receiving unit that receives login from a user;
a first authentication-request unit that transmits an authentication request to the management server using a user name and password that are received by the login-receiving unit, and when a token is received together with an "authentication successful" message from the management server, delivers the token to the program-execution platform; and
a program-activation-instruction unit that, based on a user instruction via the operation unit, instructs the program-execution platform to activate the third-party-client program;
the first CPU, by executing the third-party-client program, achieves
a second authentication-request unit that transmits an authentication request together with the token that is delivered by the program-execution platform to the third-party server; and
the first CPU, by executing the program-execution platform, achieves:
a token-delivery unit that receives the token from the first authentication-request unit and stores the token in the first storage unit, and when the third-party-client program is activated, delivers the token that is stored in the first storage unit to the activated third-party-client program; and
a program-activation unit that, based on an instruction from the program-activation-instruction unit, activates the instructed third-party-client program;
the management server comprises:
a second CPU:
a second communication unit capable of network communication; and
a second storage unit; wherein
the second CPU, by executing the management server program, achieves:
a first authentication unit that performs user authentication based on an authentication request that uses a user name and a password and that is received from the first authentication-request unit of the image forming apparatus, and when user authentication is successful, returns an "authentication successful" message together with the token to the first authentication-request unit;
a token-creation unit that, when user authentication is successful, creates the token and stores the token in the second storage unit; and
a second authentication unit that performs user authentication for an inquiry using the token from the third-party server;
the third-party server comprises:
a third CPU; and
a third communication unit capable of network communication; wherein the third CPU, by executing a third-party server program, achieves a third authentication unit that receives an authentication request that uses the token from the second authentication-request unit of the image forming apparatus, and performs an inquiry using the token to the second authentication unit of the management server, and when an "authentication successful" message is transmitted from the second authentication unit, transfers the transmitted "authentication successful" message to the second authentication-request unit.

2. The authentication system according to claim 1, wherein the second authentication unit performs user authentication by comparing the token that is received from the third-party server with the token that is stored in the second storage unit.

3. The authentication system according to claim 1, further comprising an authentication server that is network connected with the management server; wherein the authentication server includes a fourth CPU;

the fourth CPU, by executing an authentication server program, achieves a fourth authentication unit, in cooperation with the first authentication unit of the management server, performs user authentication of a user that is not registered in the management server; and the first authentication unit of the management server, when a user name that is received from the first authentication-request unit of the image forming apparatus is not registered in the management server, transfers the authentication request that uses the user name and the password received from the first authentication-request unit of the image forming apparatus to the fourth authentication unit of the authentication server.

4. An authentication method in an authentication system that includes a management server, an image forming apparatus and a third-party server that are connected to a network, whereby a login-receiving unit of the image forming apparatus receives login from a user;

a first authentication-request unit of the image forming apparatus transmits an authentication request to the management server using a user name and a password that are received by the login-receiving unit;

a first authentication unit of the management server performs user authentication based on an authentication request that uses the user name and password and that is received from the first authentication-request unit of the image forming apparatus;

when user authentication is successful, a token-creation unit of the management server creates a token and stores the token in a second storage unit, and the first authentication unit of the management server returns an "authentication successful" message together with the token to the first authentication-request unit;

the first authentication-request unit that receives the "authentication successful" message together with the token delivers the token to a token-delivery unit;

the token-delivery unit to which the token is delivered stores the received token in a first storage unit;

a program-activation-instruction unit of the image forming apparatus, based on a user instruction via an operation unit, instructs a program-activation unit to activate a third-party-client program;

the program-activation unit activates the third-party-client program;

the token-delivery unit delivers the token that is stored in the first storage unit to the activated third-party-client program;

a second authentication-request unit of the third-party-client program transmits an authentication request together with the token that is delivered by the token-delivery unit to the third-party server;

a third authentication unit of the third-party server receives the authentication request that uses the token from the second authentication-request unit of the image forming apparatus, and performs an inquiry using the token to a second authentication unit of the management server;

the second authentication unit of the management server performs user authentication for the inquiry that uses the token from the third-party server; and a third authentication unit of the third-party server, when an "authentication successful" message is transmitted from the second authentication unit, transfers the transmitted "authentication successful" message to the second authentication-request unit.

* * * * *